United States Patent
Kariya et al.

(10) Patent No.: US 9,669,573 B2
(45) Date of Patent: Jun. 6, 2017

(54) INJECTION MOLDING APPARATUS AND INJECTION MOLDING METHOD

(71) Applicant: MITSUBISHI HEAVY INDUSTRIES PLASTIC TECHNOLOGY CO., LTD., Nagoya-shi, Aichi (JP)

(72) Inventors: Toshihiko Kariya, Nagoya (JP); Naoki Toda, Nagoya (JP); Munehiro Nobuta, Nagoya (JP); Kiyoshi Kinoshita, Nagoya (JP); Takeshi Yamaguchi, Nagoya (JP); Kosuke Ikeda, Tokyo (JP); Yuji Suzumura, Tokyo (JP); Hitoshi Onuma, Tokyo (JP); Ryoji Okabe, Tokyo (JP); Masanori Takahashi, Tokyo (JP)

(73) Assignee: MITSUBISHI HEAVY INDUSTRIES PLASTIC TECHNOLOGY CO., LTD., Nagoya-Shi, Aichi (JP)

( * ) Notice: Subject to any disclaimer, the term of this patent is extended or adjusted under 35 U.S.C. 154(b) by 148 days.

(21) Appl. No.: 14/770,973

(22) PCT Filed: Nov. 6, 2013

(86) PCT No.: PCT/JP2013/006530
§ 371 (c)(1),
(2) Date: Aug. 27, 2015

(87) PCT Pub. No.: WO2014/170932
PCT Pub. Date: Oct. 23, 2014

(65) Prior Publication Data
US 2016/0009010 A1    Jan. 14, 2016

(30) Foreign Application Priority Data
Apr. 15, 2013   (JP) .................... 2013-084564

(51) Int. Cl.
B29C 45/60     (2006.01)
B29C 45/18     (2006.01)
(Continued)

(52) U.S. Cl.
CPC ...... *B29C 45/1816* (2013.01); *B29C 45/0005* (2013.01); *B29C 45/1808* (2013.01); *B29C 45/50* (2013.01); *B29C 45/60* (2013.01); *B29K 2105/12* (2013.01)

(58) Field of Classification Search
CPC .......................... B29C 45/0005; B29C 45/60
(Continued)

(56) References Cited

U.S. PATENT DOCUMENTS 4,006,209 A * 2/1977 Chiselko ............. B29C 47/1063
                                                      264/211
5,275,776 A * 1/1994 Hara .................. B29C 43/02
                                                      264/257
(Continued)

FOREIGN PATENT DOCUMENTS

CN      101068672 A    11/2007
GB      1291997 A      10/1972
(Continued)

OTHER PUBLICATIONS

PCT/ISA/210, "International Search Report for International Application No. PCT/JP2013/006530," Feb. 10, 2014.
(Continued)

*Primary Examiner* — Jill Heitbrink
(74) *Attorney, Agent, or Firm* — Manabu Kanesaka; Benjamin Hauptman; Kenneth Berner (57) ABSTRACT

The injection molding apparatus of the present invention includes: a heating cylinder; a screw that is provided rotatably in an inner portion of the heating cylinder; a resin feed hopper that feeds a resin pellet; and a fiber feed device that is provided ahead of the resin feed hopper and feeds rein-
(Continued)

forcing fibers into the heating cylinder. The screw includes a first stage that is located on a rear side, and in which the resin pellet is melted, and a second stage that is located on a front side, and in which the melted resin pellet and the reinforcing fibers are mixed, and a lead of a second flight provided in the second stage is larger than a lead of a first flight provided in the first stage.

24 Claims, 6 Drawing Sheets

(51) Int. Cl.
  *B29C 45/00* (2006.01)
  *B29C 45/50* (2006.01)
  *B29K 105/12* (2006.01)
(58) Field of Classification Search
  USPC .................................... 366/76.6, 88
  See application file for complete search history.

(56) References Cited

U.S. PATENT DOCUMENTS

| | | |
|---|---|---|
| 6,228,308 B1 | 5/2001 | Uehara et al. |
| 2006/0101768 A1 | 5/2006 | Watson et al. |
| 2007/0007685 A1 | 1/2007 | Gleich et al. |
| 2011/0272847 A1 | 11/2011 | Hehl |
| 2013/0163369 A1* | 6/2013 | Yusa ................ B29B 7/42 366/79 |

FOREIGN PATENT DOCUMENTS

| | | |
|---|---|---|
| JP | S55-159951 A | 12/1980 |
| JP | H02-153714 A | 6/1990 |
| JP | H03-76614 A | 4/1991 |
| JP | H06-134826 A | 5/1994 |
| JP | H08-156055 A | 6/1996 |
| JP | H10-180823 A | 7/1998 |
| JP | 2003-191272 A | 7/2003 |
| JP | 2005-169646 A | 6/2005 |
| JP | 2007-15382 A | 1/2007 |
| JP | 2008-520471 A | 6/2008 |
| JP | 2012-56173 A | 3/2012 |
| JP | 2012-511445 A | 5/2012 |

OTHER PUBLICATIONS

China Patent Office, "Office Action for Chinese Patent Application No. 201380074307.X," May 5, 2016.

* cited by examiner

INJECTION MOLDING APPARATUS AND INJECTION MOLDING METHOD

RELATED APPLICATIONS

The present application is National Phase of International Application No. PCT/JP2013/006530 filed Nov. 6, 2013, and claims priority from Japanese Application No. 2013-084564, filed Apr. 15, 2013, the disclosure of which is hereby incorporated by reference herein in its entirety.

TECHNICAL FIELD

The present invention relates to injection molding of a resin containing reinforcing fibers.

BACKGROUND ART

Molded articles of a fiber reinforced resin whose strength is increased by containing reinforcing fibers are used for various purposes. To obtain the molded articles by injection molding, a thermoplastic resin is melted by rotating a screw in a cylinder that is a plasticizing device, kneaded with fibers, and then injected into a mold of an injection molding apparatus.

In order to obtain the effect of improving strength by the reinforcing fibers, the reinforcing fibers are desired to be dispersed uniformly in the resin. Although a strict kneading condition may be employed for achieving the uniform dispersion, a shear force on a kneaded material is inversely increased, and the reinforcing fibers are thereby cut off. Thus, a fiber length after molding becomes significantly shorter than an original fiber length, and the obtained fiber reinforced resin molded article may not be able to satisfy a desired property (Patent Literature 1). Therefore, it is necessary to select an injection molding condition under which an appropriate shear force is obtained at the time of kneading.

Also, in order to prevent the fibers from being cut off in a plasticizing process, there is proposed a plasticizing device which includes a cylinder separately provided with a feed port for feeding a thermoplastic resin raw material to the cylinder, a feed port for feeding a fiber material, and a vent port for removing a gas content contained in the resin, and a screw (Patent Literature 2).

The fibers of the fiber reinforced resin are cut off in the plasticizing process mainly in a front half of the plasticizing device, that is, a feed section and a compression section of a resin pellet. Thus, in the plasticizing device, the feed port for a fiber material is provided downstream of the compression section where the thermoplastic resin is sufficiently melted.

CITATION LIST

Patent Literature

Patent Literature 1: Japanese Patent Laid-Open No. 2012-56173
Patent Literature 2: Japanese Patent Laid-Open No. H3-76614

SUMMARY OF INVENTION

Technical Problem

The present inventors have confirmed that reinforcing fibers can be dispersed uniformly to a substantial extent by selecting a condition of injection molding and specifications of added reinforcing fibers. On the other hand, the present inventors have also experienced that, in molding using a cylinder separately having a feed port for feeding a thermoplastic resin raw material and a feed port for feeding a fiber material, and a screw, particularly similarly to the plasticizing device disclosed in Patent Literature 2, a region having an obviously small content of reinforcing fibers as compared to another region where the reinforcing fibers are uniformly dispersed is generated in an unspecified position of a fiber reinforced resin molded article. If there is an irregularity in a distribution of the content of the reinforcing fibers in one molded article, a position with a low strength is locally generated, so that a designed strength may not be obtained in the molded article. Also, a degree of shrinkage of the resin becomes unstable in cooling solidification, so that molding defects such as large warpage or sink marks may be generated.

The present invention provides an injection molding apparatus and an injection molding method for a resin material containing reinforcing fibers capable of preventing or suppressing an irregularity in a content of the reinforcing fibers, and obtaining a stable molding quality.

Solution to Problem

As a result of investigating a cause of generation of a region having an obviously small content of reinforcing fibers, the present inventors have found that an injecting process after a thermoplastic resin is melted and a plasticizing process of melting the thermoplastic resin are involved. That is, in the injecting process, a screw is forwardly moved while rotation of the screw is stopped, to discharge a melted resin containing reinforcing fibers toward a mold. The reinforcing fibers are normally fed from a hopper provided on an upper portion of a cylinder that is a plasticizing device. However, since the rotation of the screw is stopped, the reinforcing fibers naturally drop to move downward in a groove between flights of the screw by its own weight. However, the reinforcing fibers are easily tangled in the raw material hopper. Particularly, when a fiber length is 2 mm or more, a tendency starts in which the reinforcing fibers are difficult to naturally drop. When the fiber length is 4 mm or more, the reinforcing fibers are difficult to naturally drop into the screw groove if the hopper is filled with the reinforcing fibers. Therefore, during the injecting process in which the flights pass through a hopper hole at high speed to block the hopper hole, the fibers cannot be dropped into the screw. Even if the reinforcing fibers drop into the screw groove through a space between the flights passing at high speed, it is not easy to fill the screw groove with the reinforcing fibers since the melted resin adheres to the groove between the flights and the melted resin works as resistance. Therefore, a region with a small reinforcing fiber content is generated in a groove region between flights, particularly in a lower region of the screw during the injecting process.

Also, in the plasticizing process, the screw is rotated. Thus, the flights pass through and block the hopper hole, and become an obstacle to the drop of the fibers into the screw. Particularly, when the fiber length is 2 mm or more, the drop of the reinforcing fibers into the screw groove tends to be unstable. It is found that a region with a small reinforcing fiber content is thereby generated in a molded article.

An injection molding apparatus for a fiber reinforced resin of the present invention includes: a cylinder in which a discharge nozzle is formed on a front side; a (single-shaft)

screw that is provided rotatably in an inner portion of the cylinder; a resin feed section that feeds a resin raw material into the cylinder; and a fiber feed section that is provided ahead of the resin feed section and feeds reinforcing fibers into the cylinder.

The screw in the present invention includes a first stage that is located on a rear side, and in which the resin raw material is melted, and a second stage that is located on the front side and is connected to the first stage, and in which the melted resin raw material and the reinforcing fibers are mixed. A lead L2 of a second flight provided in the second stage is larger than a lead L1 of a first flight provided in the first stage at least in a fiber receiving region where the reinforcing fibers are fed from the fiber feed section.

In the present invention, by increasing the lead L2 of the second flight, that is, a groove width between adjacent second flights, a space into which the reinforcing fibers drop to be charged is increased. Also, by increasing the lead L2 of the second flight to decrease the number of flight threads per unit distance between the fiber feed section and a distal end of the screw, the number of times in which a vent hole is blocked by the second flight when the screw moves forward is reduced during the injecting process. Also, during the plasticizing process, since the number of flight threads per unit distance between the fiber feed section and the screw distal end is small, the number of times in which the vent hole is blocked by the second flight when the screw moves backward by rotating the screw and measuring a melted resin is reduced. Therefore, it is possible to continuously drop the reinforcing fibers into a groove without stopping the drop of the reinforcing fibers by the second flight in both the forward movement of the screw during the injecting process and the backward movement of the screw during the plasticizing process.

Also, by increasing the lead L2 of the second flight, a region in which the melted resin does not adhere to the groove between the flights can be increased in a second flight region, so that the reinforcing fibers are not blocked by the resin adhering to the screw. It is thus possible to spread the reinforcing fibers to a lower side of the screw. Accordingly, even when reinforcing fibers particularly having a length of 2 mm or more are fed, it is possible to prevent generation of a region with a small reinforcing fiber content.

In the injection molding machine of the present invention, the lead L2 of the second flight in the fiber receiving region is preferably 1.2×D to 2.0×D when an inner diameter of the cylinder is D, and a width W2 of the second flight in the fiber receiving region is preferably 0.01×L2 to 0.3×L2.

Also, in the injection molding machine of the present invention, the lead L1 of the first flight is preferably 0.4×L2 to 0.8×L2.

As for the second stage in the present invention, some elements can be added as described below.

That is, in the injection molding machine of the present invention, the second stage may include a region with no second flight partially or entirely on a distal end side with respect to the fiber receiving region.

Also, in the injection molding machine of the present invention, the second stage may include a mixing mechanism in a predetermined region on a distal end side with respect to the fiber receiving region.

Also, in the injection molding machine of the present invention, the second stage may include a third flight having a lead L3 of 1.2×D or less in a predetermined region on a distal end side with respect to the fiber receiving region.

Also, in the injection molding machine of the present invention, a compression ratio of the second stage may be 1.0 to 2.0.

Also, in the injection molding machine of the present invention, an outer diameter D2 of a portion or a whole of the second flight of the second stage may be smaller than a maximum outer diameter Dmax of the screw.

Advantageous Effects of Invention

In accordance with the present invention, by increasing the lead L2 of the second flight, the reinforcing fibers fed in the injecting process or the plasticizing process are easily charged into the screw groove, so that a region of the screw groove with a small reinforcing fiber amount can be reduced. Therefore, in accordance with the present invention, it is possible to prevent generation of a region with a small reinforcing fiber content in a molded article. It is also possible to thereby obtain a stable molding quality.

BRIEF DESCRIPTION OF DRAWINGS

FIGS. 2A to 2D are views schematically illustrating a resin melting state in respective procedure steps of injection molding in the present embodiment.

FIGS. 3A to 3C are views schematically illustrating a resin melting state in procedure steps of conventional injection molding.

FIGS. 4A and 4B are views illustrating injection molding in the present embodiment.

DESCRIPTION OF EMBODIMENTS

In the following, the present invention will be described in detail based on embodiments shown in the accompanying drawings.

First Embodiment

Figure 1:
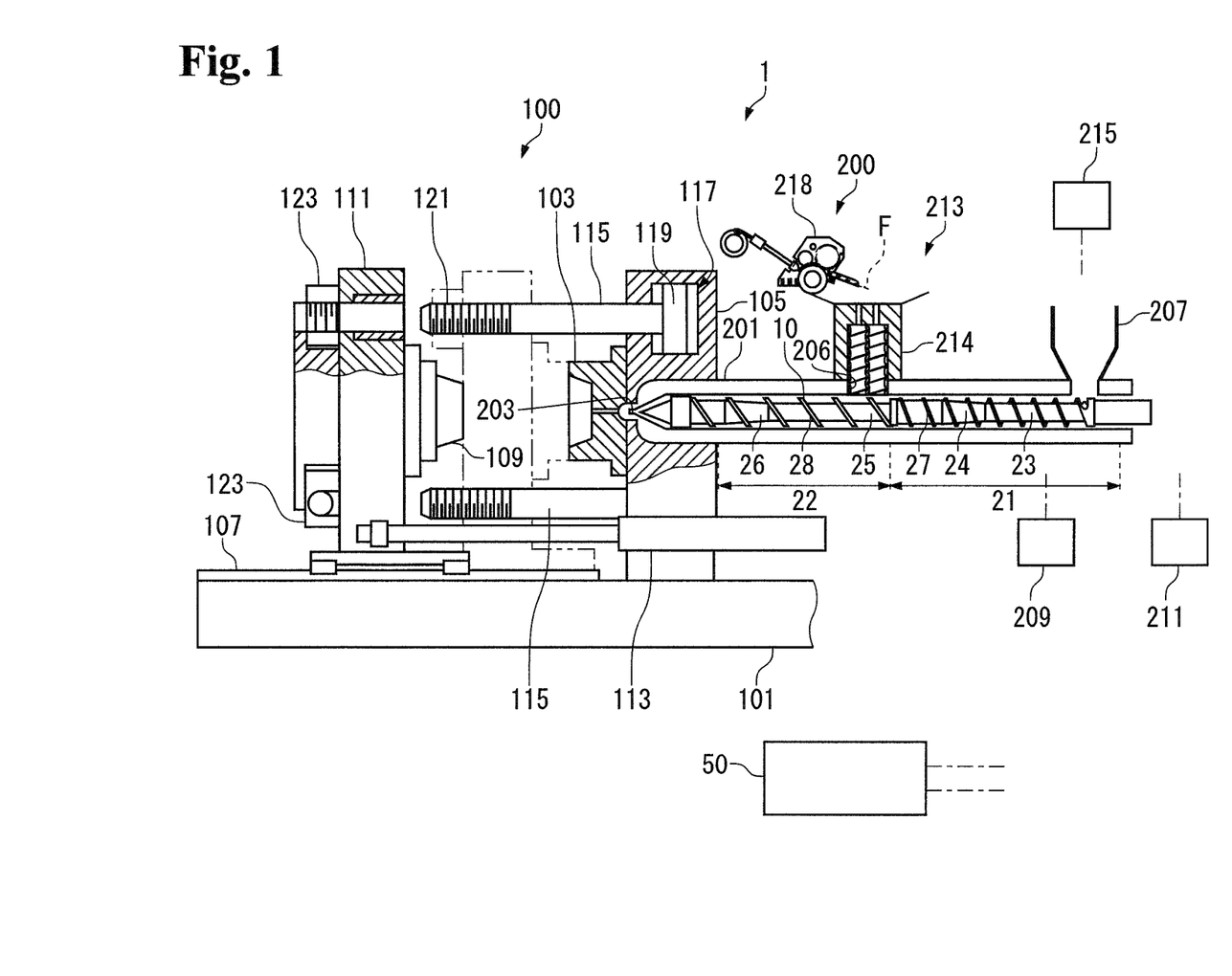
FIG. 1 is a view illustrating a configuration of an injection molding apparatus according to a present embodiment.

An injection molding machine 1 according to a present embodiment includes a mold clamping unit 100, a plasticizing unit 200, and a control section 50 that controls operations of the units as shown in FIG. 1.

In the following, outlines of a configuration and the operation of the mold clamping unit 100, and a configuration and the operation of the plasticizing unit 200 are described, and a procedure of injection molding by the injection molding machine 1 is subsequently described.

[Configuration of the Mold Clamping Unit]

The mold clamping unit 100 includes a fixed die plate 105 that is fixed onto a base frame 101, and to which a fixed mold 103 is attached, a movable die plate 111 that moves in a right-left direction in the drawing on a slide member 107, such as a rail and a slide plate, by operating a hydraulic cylinder 113, and to which a movable mold 109 is attached, and a plurality of tie bars 115 that connect the fixed die plate 105 and the movable die plate 111. In the fixed die plate 105, a mold-clamping hydraulic cylinder 117 is provided coaxially with each of the tie bars 115, and one end of each of the tie bars 115 is connected to a ram 119 of the hydraulic cylinder 117.

The respective elements perform a necessary operation according to an instruction of the control section 50.

[Operation of the Mold Clamping Unit]

The general operation of the mold clamping unit 100 is as follows.

First, the movable die plate 111 is moved to a position of an alternate long and two short dashes line in the drawing by operating the hydraulic cylinder 113 for opening and closing a mold, to bring the movable mold 109 into abutment with the fixed mold 103. Subsequently, by engaging male threaded portions 121 of each of the tie bars 115 with half nuts 123 provided on the movable die plate 111, the movable die plate 111 is fixed to the tie bars 115. A pressure of hydraulic oil in an oil chamber on the movable die plate 111-side within the hydraulic cylinder 117 is increased, to clamp the fixed mold 103 and the movable mold 109 together. After the mold clamping is performed as described above, a melted resin M is injected into a cavity of the mold from the plasticizing unit 200, so that a molded article is formed.

Since a screw 10 of the present embodiment is of a type in which a thermoplastic resin pellet P and reinforcing fibers F are fed separately in a screw longitudinal direction as described below, an entire length of the screw 10 or an entire length of the plasticizing unit 200 tends to be extended. Therefore, the present embodiment employs the mold clamping unit 100 having the aforementioned configuration for achieving space saving by enabling the mold clamping unit to be installed in a small space in which a mold clamping device of a toggle link-type or a type provided with a mold clamping cylinder on a back surface of a movable die plate cannot be installed. However, the configuration of the mold clamping unit 100 described here is merely one example, and shall not preclude application of another configuration or replacement with another configuration. For example, although the present embodiment employs the hydraulic cylinder 113 as an actuator for opening and closing a mold, the actuator for opening and closing a mold may be replaced with a combination of a member that converts a rotational motion to a linear motion, such as a ball screw and a rack and pinion, and an electric motor, such as a servo motor and an induction motor. It also goes without saying that the mold clamping unit 100 may be replaced with an electrically-driven or hydraulically-driven toggle link-type mold clamping unit.

[Configuration of the Plasticizing Unit]

The plasticizing unit 200 includes a barrel-type heating cylinder 201, a discharge nozzle 203 that is provided on a front side of the heating cylinder 201, the screw 10 that is provided in an inner portion of the heating cylinder 201, a fiber feed device 213 to which the reinforcing fibers F are fed, and a resin feed hopper 207 to which the resin pellet P is fed. The fiber feed device 213 is connected to a vent hole 206 that is provided ahead of the resin feed hopper 207.

The plasticizing unit 200 includes a first electric motor 209 that forwardly or backwardly moves the screw 10, a second electric motor 211 that can normally or reversely rotate the screw 10, and a pellet feed device 215 that feeds the resin pellet P to the resin feed hopper 207. The respective elements perform a necessary operation according to an instruction of the control section 50. Note that a side where the melted resin M is injected is a front, and a side where a raw material (the reinforcing fibers, the resin pellet) is fed is a rear in the plasticizing unit 200.

The screw 10 has two stage-type design similar to a so-called gas-vent screw. To be more specific, the screw 10 is designed such that a first stage 21 including a feed section 23 and a compression section 24 is provided on a rear side of the screw 10, and a second stage 22 including a feed section 25 and a compression section 26 is connected to the first stage 21. A resin is melted (the melted resin M) in the first stage 21, and the melted resin M and the reinforcing fibers F are mixed and dispersed in the second stage 22. The design intends to reduce a pressure of the melted resin M in the heating cylinder 201, which is compressed to have a high pressure at a terminal end portion (a front-side end) of the first stage 21, by connecting the feed section 25 that is a deep groove portion of the second stage 22 to a terminal end (the front-side end) of the first stage 21 directly or indirectly via a throttle flow path so as to charge the reinforcing fibers F.

In the screw 10, a first flight 27 provided in the first stage 21 and a second flight 28 provided in the second stage 22 satisfy the following conditions. Please refer to FIGS. 5A to 5E.

Figure 5A:
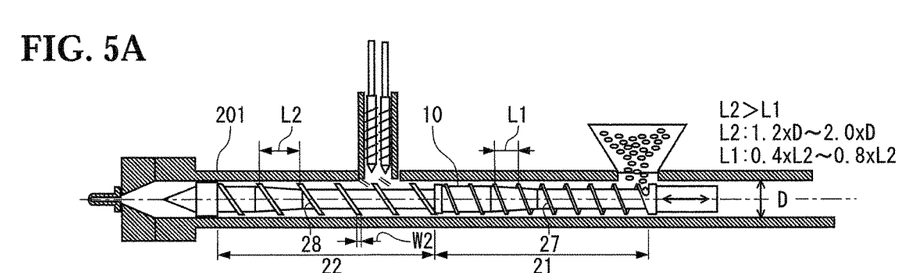
FIGS. 5A to 5E are views illustrating a screw of the present embodiment.

First, a lead L2 of the second flight 28 of the second stage 22 is set to be larger than a lead L1 of the first flight 27. This is because of the following reasons. The second stage 22 receives the feed of the reinforcing fibers F on a rear end side during a plasticizing process and an injecting process. When the lead L2 is large, a groove width between the second flights 28 is large, and a space into which the reinforcing fibers F drop to be charged is increased. Also, when the lead L2 is large, the number of times in which the vent hole 206 is blocked by the second flight 28 in backward movement of the screw 10 during the plasticizing process and forward movement of the screw 10 during the injecting process is reduced. Therefore, even during the backward movement or the forward movement of the screw 10, it is possible to continuously drop the reinforcing fibers F into a groove without stopping the drop of the reinforcing fibers F by the second flight 28. Also, although the melted resin M is already in a portion of the groove to be charged with the reinforcing fibers F, the melted resin M in the groove drips downward by its own weight, and a gap is formed between the melted resin M on an upper surface of the screw 10 and an inner wall surface of the heating cylinder 201 when the plasticizing process is finished and the screw 10 stops rotating. Accordingly, the reinforcing fibers F can be put into the gap even when the melted resin M in the groove passes through the vent hole 206 along with the forward movement of the screw 10 during the injecting process. As a result, the reinforcing fibers F can be dropped into the groove of the screw 10. Therefore, when the lead L2 is large, an entire region of the groove width can be used by ignoring a region filled with the melted resin M since the reinforcing fibers F can be charged into a space on an upper side of the screw emptied with the melted resin M dripping downward by its own weight even when the melted resin M is in the groove. It thus becomes easy to charge the reinforcing fibers F into the screw groove during the injecting process. Increasing the lead L2 is also effective in suppressing breakage of the reinforcing fibers F. To be more specific, since a spiral groove length of the screw groove to a distal end portion of the screw can be shortened, a distance or a time in which the melted resin M containing the reinforcing fibers F by the rotation of the screw during the plasticizing process receives a shear force by a swirling flow in the screw groove can be reduced.

Based on the above point, the lead L2 of the second flight 28 is preferably set to 1.2×D or more, and more preferably set to 1.4×D or more. Accordingly, the reinforcing fibers F can be stably dropped into the groove of the screw 10 during the injecting process. Note that D is an inner diameter of the heating cylinder 201.

However, if the lead L2 is too large, a force for conveying the melted resin M is decreased. The conveyance of the melted resin M becomes unstable even with a back pressure (5 to 10 MPa) required for normal plasticization, and the melted resin M flows back to the vent hole 206 due to the back pressure to easily cause vent-up. Therefore, the lead L2 is preferably set to 2.0×D or less, and more preferably set to 1.7×D or less. That is, the lead L2 of the second flight 28 is preferably set to 1.2×D to 2.0×D, and more preferably set to 1.4×D to 1.7×D.

Also, a flight width W2 of the second flight 28 is set to 0.01 to 0.3 times of the lead L2 (0.01×L2 to 0.3×L2). This is because if the flight width W2 is smaller than 0.01 times of the lead L2, the second flight 28 has an insufficient strength, and if the flight width W2 exceeds 0.3 times of the lead L2, the screw groove width becomes small, so that the fibers are caught on a flight top portion and become difficult to drop into the groove.

Although an example in which the second flight 28 has a single line is described here, a double-line flight may be provided in the present invention. In this case, the flight having a small width is preferably employed by setting the flight width to 0.01 to 0.15 times of the lead L2.

Note that it is not necessary to make the lead L2 of the second flight 28 larger than the lead L1 of the first flight 27 as described above in an entire region of the second stage 22. This is because the object can be achieved as long as the lead L2 of the second flight 28 is made larger in a region for receiving the reinforcing fibers F fed from the vent hole 206 within the second stage 22. As one index, the lead L2 of the second flight 28 is made larger in a range of at least 2.0×D on the second stage 22-side from a boundary portion between the first stage 21 and the second stage 22.

In the first stage 21, the lead L1 is made smaller than the lead L2 in order to ensure a conveying speed and a plasticizing capacity of the melted resin M. The lead L1 of the first flight 27 of the first stage 21 is preferably set to 0.4 to 0.8 times of the lead L2 of the second flight 28, and more preferably set to 0.5 to 0.7 times of the lead L2. If the lead L1 is smaller than 0.4 times of the lead L2, the conveying speed of the melted resin M in the first stage 21 is decreased, to easily cause retention thermal degradation or generation of air bubbles. The plasticizing capacity is also decreased, so that productivity may be deteriorated. Also, if the lead L1 is larger than 0.8 times of the lead L2, an amount of the melted resin M flowing into the second stage 22 is increased. Thus, the space into which the reinforcing fibers F are charged is reduced, and it becomes difficult to feed a required amount of the reinforcing fibers F.

[Operation of the Plasticizing Unit]

The general operation of the plasticizing unit 200 is as follows. Please refer to FIG. 1.

When the screw 10 provided in the inner portion of the heating cylinder 201 is rotated, the reinforcing fibers F fed from the fiber feed device 213 via the vent hole 206 and the pellet of a thermoplastic resin (the resin pellet P) fed from the resin feed hopper 207 are sent out toward the discharge nozzle 203-side on the front side of the heating cylinder 201.

In this course, the resin pellet P (the melted resin M) that is heated from a conveying section and starts to be gradually melted is kneaded with the reinforcing fibers F, and is thereafter injected into the cavity formed between the fixed mold 103 and the movable mold 109 of the mold clamping unit 100 by a predetermined amount. It goes without saying that a basic operation of the screw 10 is performed in which the injection is performed with the screw 10 moving forward after moving backward upon receiving the back pressure along with the melting of the resin pellet P. Also, the configuration shall not preclude application of another configuration or replacement with another configuration, for example, providing a heater for melting the resin pellet P outside of the heating cylinder 201.

[Procedure of the Injection Molding]

The injection molding machine 1 including the above elements performs the injection molding in the following procedure.

As is well known, the injection molding includes a mold clamping process of clamping a mold at a high pressure by closing the movable mold 109 and the fixed mold 103, a plasticizing process of performing plasticization by heating and melting the resin pellet P in the heating cylinder 201, an injecting process of injecting and charging the plasticized melted resin M into the cavity formed by the movable mold 109 and the fixed mold 103, a holding process of cooling the melted resin M charged into the cavity until the melted resin M is solidified, a mold opening process of opening the mold, and a removing process of removing a molded article cooled and solidified in the cavity. The above respective processes are performed sequentially or partly simultaneously, so that one cycle is completed.

Subsequently, the plasticizing process and the injecting process to which the present embodiment is related are sequentially described with reference to FIGS. 2A, 2B, 2C, and 2D.

[Plasticizing Process]

In the plasticizing process, the resin pellet P is fed from the resin feed hopper 207 on the rear side of the heating cylinder 201. The screw 10 is located on the front side of the heating cylinder 201 when plasticization is just started, and the screw 10 is backwardly moved while being rotated from the initial position ("plasticization start" in FIG. 2A). By rotating the screw 10, the resin pellet P fed between the screw 10 and the heating cylinder 201 is gradually melted while being heated upon receiving a shear force, and is conveyed forward. Note that the rotation (direction) of the screw 10 in the plasticizing process is normal rotation in the present invention. When the melted resin M is conveyed to the fiber feed device 213, the reinforcing fibers F are fed from the fiber feed device 213. The reinforcing fibers F are kneaded with and dispersed in the melted resin M, and conveyed forward together with the melted resin M along with the rotation of the screw 10. When the resin pellet P and the reinforcing fibers F continue to be fed, and the screw 10 continues to be rotated, the melted resin M is conveyed to the front side of the heating cylinder 201, and is discharged from the screw to be accumulated on the front side of the screw 10. The screw 10 is backwardly moved by a balance between the resin pressure of the melted resin M accumulated on the front side of the screw 10 and the back pressure that suppresses the backward movement of the screw 10. At this time, the flight intermittently blocks the vent hole 206 by the rotation and the backward movement of the screw 10. However, since the lead L2 of the second flight 28 of the second stage 22 is set to be large as described above in the screw 10, it becomes easy to charge the reinforcing fibers F into the groove of the screw 10. After that, when a required amount of the melted resin M is accumulated, the rotation and the backward movement of the screw 10 are stopped ("plasticization completion" in FIG. 2B).

Figure 2A:
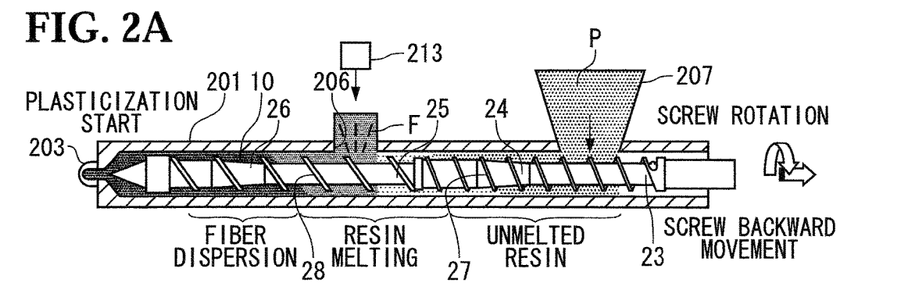
FIG. 2A shows when plasticization is just started.
Figure 2B:
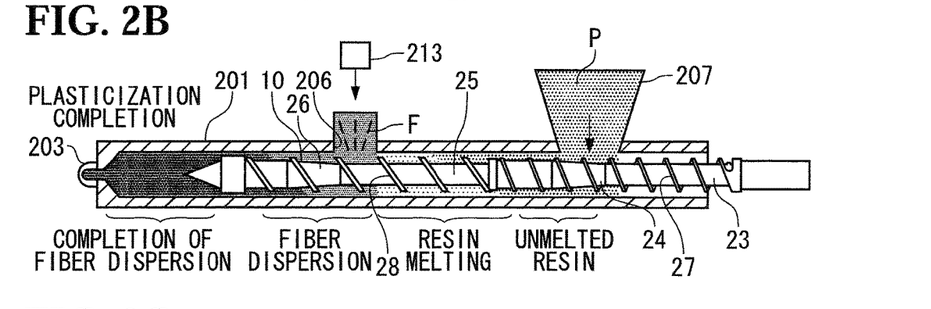
FIG. 2B shows when plasticization is completed.

FIG. 2B schematically shows a state of the resin (the resin pellet P, the melted resin M) and the reinforcing fibers F separately in four stages: "unmelted resin," "resin melting," "fiber dispersion," and "completion of fiber dispersion." At a stage of the "plasticization completion," the "completion of fiber dispersion" ahead of the screw 10 shows a state in which the reinforcing fibers F are dispersed in the melted resin M and provided for injection, and the "fiber dispersion" shows that the fed reinforcing fibers F are being dispersed in the melted resin M along with the rotation of the screw 10. Also, the "resin melting" shows that the resin pellet P is being gradually melted upon receiving a shear force, and the "unmelted resin" shows that the resin pellet P has not been melted yet even upon receiving the shear force.

When the plasticizing process is completed, a resin melting region shown in FIG. 2B is located behind the fiber feed device 213 that feeds the reinforcing fibers F. Thus, the reinforcing fibers F have not been fed to the groove of the screw 10 in this region.

[Injecting Process]

Figure 2C:
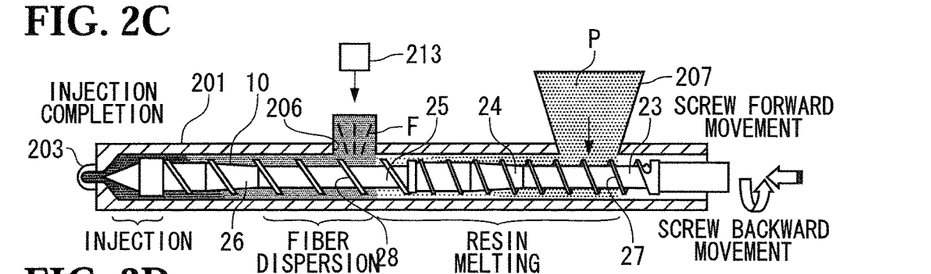
FIG. 2C shows when injection is completed.

When the injecting process is started, the screw 10 is forwardly moved as shown in FIG. 2C. Accordingly, an unillustrated non-return valve provided at the distal end portion of the screw 10 is closed. The pressure (the resin pressure) of the melted resin M accumulated on the front side of the screw 10 thereby rises, and the melted resin M is discharged toward the cavity from the discharge nozzle 203.

In the present embodiment, the reinforcing fibers F are also fed into the heating cylinder 201 by the fiber feed device 213 during the injecting process. In the following, this point is described.

Figure 3A:
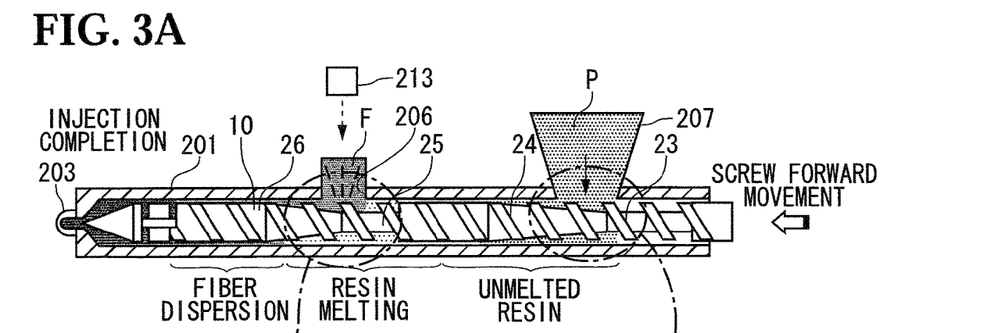
FIG. 3A shows when injection is completed corresponding to FIG. 2C.

The screw 10 moves forward from a position in FIG. 2B to a position in FIG. 2C or a position in FIG. 3A. At this time, the groove of the screw 10 in the resin melting region shown in FIG. 2B is not charged with the reinforcing fibers F.

Figure 3B:
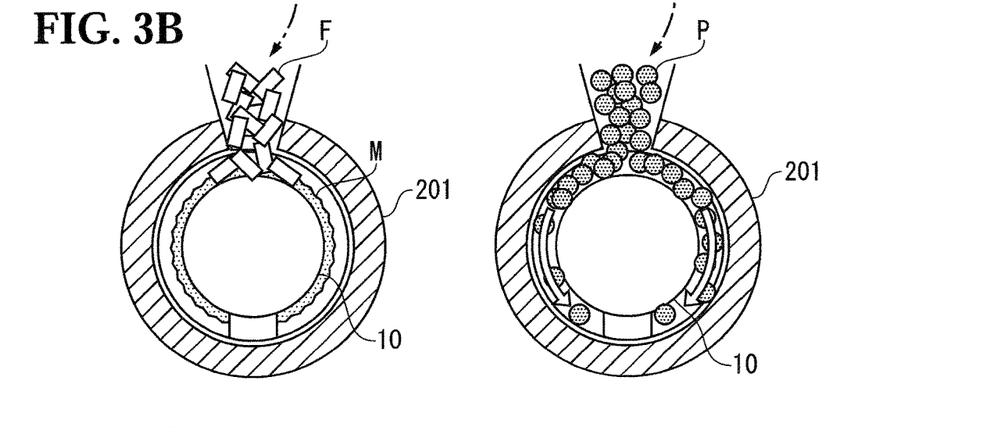
FIG. 3B is a view illustrating a problem at the time of injection.

Conventionally, since the reinforcing fibers F are easily tangled in a raw material hopper attached to the vent hole 206 that is a load port, the reinforcing fibers F cannot be charged into the screw 10 during the injecting process in which the flights lined in the longitudinal direction of the screw 10 intermittently pass through the vent hole 206 at high speed to substantially block the vent hole 206. Also, even when the reinforcing fibers F are dropped into the groove of the screw 10 through a space between of the flights passing at high speed, the reinforcing fibers F fed from the fiber feed device 213 stick to the melted resin M as shown in FIG. 3B since the melted resin M adheres to a periphery of the screw 10. It is difficult to charge the fed reinforcing fibers F to a lower side along the groove of the screw 10 since the reinforcing fibers F remain sticking to an upper portion of the screw 10. Alternatively, the melted resin M cannot be conveyed by the rotation of the screw, and the melted resin M in the groove of the screw 10 drips to the lower side of the screw 10 by gravity to be accumulated between the screw 10 and the heating cylinder 201. Thus, it is difficult to charge the fed reinforcing fibers F to the lower side of the screw 10 since the lower side is blocked by the dripped melted resin M. Therefore, the screw 10 moves forward with the groove of the screw 10 in the resin melting region shown in FIG. 2B not sufficiently charged with the reinforcing fibers F, and the resin melting region passes through the fiber feed device 213 to further reach the front side during the injecting process. Accordingly, the reinforcing fibers F are not contained in the melted resin M on the lower side of the heating cylinder 201 as shown in FIG. 3A, and the injecting process is terminated.

[Feed of the Reinforcing Fibers During the Injecting Process]

Figure 3C:
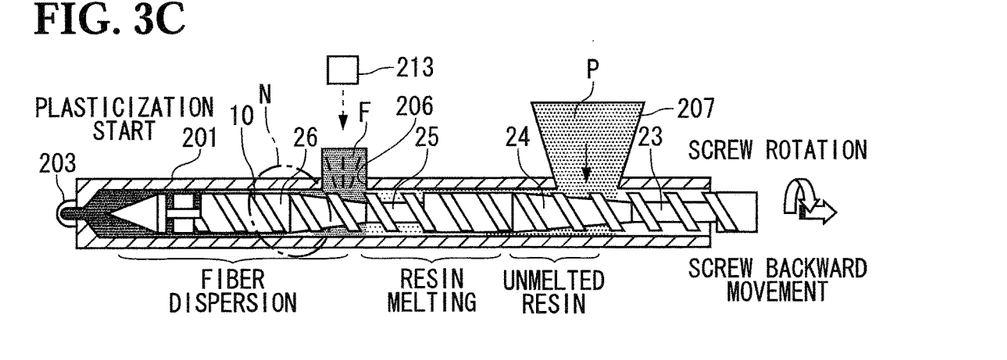
FIG. 3C shows when plasticization is started corresponding to FIG. 2D.

If the plasticizing unit 200 starts plasticization for a next molding cycle after the injecting process is terminated, a portion N not containing the reinforcing fibers F is generated as shown in FIG. 3C.

Note that the above problem does not occur in a region where the resin pellet P is fed. In the region, the resin pellet P has not been melted, and a surface temperature of the screw 10 is sufficiently lower than a temperature at which the resin pellet P is melted, so that the melted resin M does not exist around the periphery of the screw 10 (a right side in FIG. 2B). Therefore, the resin pellet P can flow down into the groove of the screw 10, particularly the lower side of the screw 10 by its own weight.

On the other hand, in the present embodiment, the reinforcing fibers F are fed into the screw by the fiber feed device 213 during the injecting process. Accordingly, the reinforcing fibers F can be sent to the lower side of the heating cylinder 201. That is, even though the flight of the screw 10 intermittently blocks the vent hole 206, or even though the melted resin M adheres to the entire periphery of the screw 10, or even though the melted resin M is accumulated on the lower side of the screw 10, the reinforcing fibers F can be spread around the periphery of the screw 10 since the reinforcing fibers F fed by a predetermined amount from the fiber feed device 213 are charged into the groove of the screw 10. Moreover, in the screw 10, since the lead L2 of the second flight 28 of the second stage 22 is set to be large as described above, there is a large region to which the melted resin M, which becomes an obstacle to charging the reinforcing fibers F, does not adhere in the groove of the screw 10. It is thus possible to more reliably spread the reinforcing fibers F around the periphery of the screw 10.

Figure 2D:
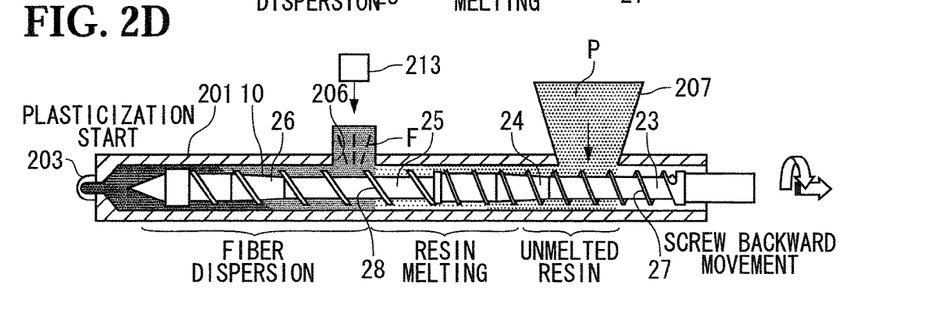
FIG. 2D shows when plasticization for a next cycle is started.

Therefore, as shown in FIG. 2D, in accordance with the present embodiment, the reinforcing fibers F can be included thoroughly in a region ahead of the fiber feed device 213.

Although the feed of the reinforcing fibers F from the fiber feed device 213 during the injecting process is preferably performed throughout an entire period of the injecting process, the feed may be stopped in a part of the period, for example, by intermittently feeding the reinforcing fibers F, or a feed speed may be changed continuously or in a phased manner. Also, in order to facilitate stable molding of non-defective articles, a feed timing and a feed amount from the fiber feed device 213 may be accurately controlled by using a timer (not shown), or various sensors such as a screw position sensor and a rotary encoder provided in the first electric motor 209 and the second electric motor 211.

[Form of the Fiber Feed Device]

Measuring feeders of such types as screw-type and piston-type can be used as the fiber feed device 213 that feeds the reinforcing fibers F into the heating cylinder 201. In this case, the reinforcing fibers F may be directly fed into the heating cylinder 201 by directly connecting the fiber feed device 213 to the heating cylinder 201, or a fiber feed hopper 205 may be provided at the vent hole 206, and the reinforcing fibers F may be fed to the fiber feed hopper 205 from the fiber feed device 213.

When the measuring feeder is directly connected to the heating cylinder 201, the reinforcing fibers F can be forcibly charged into the heating cylinder 201 by the measuring feeder. Thus, even if the reinforcing fibers F are tangled in the vent hole 206, the reinforcing fibers F can be charged into the groove of the screw 10 by a predetermined feed amount. Accordingly, a content (rate) of the reinforcing fibers F mixed with the melted resin M in the groove of the screw 10 can be optionally and easily controlled. At this time, it is also preferable to employ a simple removable structure for the measuring feeder and the heating cylinder 201 for maintenance such as cleaning of the vent hole 206.

When the screw-type measuring feeder is used, a single-shaft feeder with a single screw, or a multi-shaft feeder with a plurality of screws can be used. It is preferable to use the multi-shaft feeder capable of measuring the reinforcing fibers F so as to set a mixture rate in the melted resin M to a predetermined value, and suppressing a slip between the reinforcing fibers F and the feeder with a strong conveying force to stably feed the reinforcing fibers F. It is particularly preferable to use a twin-shaft feeder having a simple structure in view of cost, design, and control.

Thus, in the present embodiment, the reinforcing fibers F are forcibly fed into the groove of the screw 10 by providing a twin-shaft screw feeder 214 on the heating cylinder 201 as shown in FIG. 1. It goes without saying that there occurs no problem by using a single-shaft screw feeder even when the screw feeder is directly connected to the heating cylinder 201.

Also, in order to increase wettability of a surface of the reinforcing fibers F with resin, the screw feeder may be heated by an unillustrated heater. Accordingly, a temperature of the reinforcing fibers F in the screw feeder rises. It is thus possible to prevent a problem that the melted resin M is difficult to intrude into a mass of the reinforcing fibers F with the melted resin M having a lower temperature to be solidified or having a higher viscosity when the melted resin M comes into contact with the reinforcing fibers F. Accordingly, the melted resin M enters a space between fibers of the reinforcing fibers F, a bundle of fibers comes apart, and dispersion of the reinforcing fibers F in the melted resin M can be promoted. Also, when the temperature of the reinforcing fibers F is increased to a high temperature, the melted resin M more easily adheres to the reinforcing fibers F, so that a force by which the melted resin M is conveyed or rotated by the screw 10 during the plasticizing process, or a force by which the melted resin M moves forward together with the screw 10 during the injecting process can be also used as a force for drawing the reinforcing fibers F into the cylinder from the vent hole 206. In this case, it is preferable to set the heating temperature of the feeder to a glass transition point of the resin or more and a set temperature of the heating cylinder or less. A friction coefficient of the resin with respect to metal rapidly rises from around the glass transition point. Thus, by setting the temperature of the reinforcing fibers F to the glass transition point of the resin or more, the temperature of the melted resin M does not fall below the glass transition point that is a lower limit value with a large friction coefficient even when the temperature of the melted resin M is decreased by contact with the reinforcing fibers F. Thus, the effect of drawing the reinforcing fibers F by the melted resin F can be increased. Also, by setting the feeder heating temperature to the heating cylinder temperature or less, thermal degradation due to an excess temperature rise of the melted resin M can be prevented.

Also, as a method for feeding the reinforcing fibers F to the twin-shaft screw feeder 214, continuous fibers, so-called fibers in a roving state (referred to as roving fibers below) may be directly loaded, or fibers in a chopped strand state previously cut into a predetermined length (referred to as chopped fibers below) may be loaded into the twin-shaft screw feeder 214. Alternatively, the roving fibers and the chopped fibers may be mixed at a predetermined ratio and loaded. When the roving fibers are directly loaded, uncut long fibers can be loaded into the screw, so that long fibers can be left in the melted resin that is finally injected. When the chopped fibers are loaded, fibers are tangled to bind each other, so that a slip between the fibers is suppressed, and the conveyance of the fibers by the feeder becomes stable. When the chopped fibers and the roving fibers are mixed and loaded, both the effects can be obtained in which the long fibers can be obtained by the roving fibers, and the conveyance of the fibers by the feeder becomes stable because of the tangle of the chopped fibers.

When the chopped fibers are loaded, the fibers may be conveyed as roving fibers up to a position around a fiber load port of the measuring feeder, and loaded into the above measuring feeder immediately after cutting the roving fibers at the position around the fiber load port. Since the chopped fibers that are easily scattered are not exposed until being loaded into the molding machine, workability can be improved.

In the present embodiment, a roving cutter 218 is provided at the position around the fiber load port of the twin-shaft screw feeder 214. The roving fibers are cut by the roving cutter 218 to obtain the chopped fibers, which are then fed to the twin-shaft screw feeder 214.

Also, as the roving cutter 218, a rotary-type cutter that rotates toward the twin-shaft screw feeder 214 is used. Accordingly, the cut chopped fibers can be directly loaded into a screw groove of the twin-shaft screw feeder 214 by using a rotational force of the cutter without using a storage member for the reinforcing fibers F such as a hopper. The chopped fibers can be loaded into the twin-shaft screw feeder 214 in a state in which the fibers are less tangled immediately after cutting. Thus, the chopped fibers can be efficiently engaged into the twin-shaft screw feeder 214, and the chopped fibers can be stably fed into the groove of the screw 10 from the twin-shaft screw feeder 214.

In a case in which the multi-shaft feeder is used as the screw-type measuring feeder, feeder screws of a so-called twin-shaft extrusion molding machine type in which flights and grooves of the screws mesh with each other, or feeder screws that are independent by a partition wall, or that are independent without interfering with each other even without the partition wall may be employed. When the feeder screws of the twin-shaft extrusion molding machine type are used, the screws may be rotated in the same direction or in different directions.

Figure 6A:
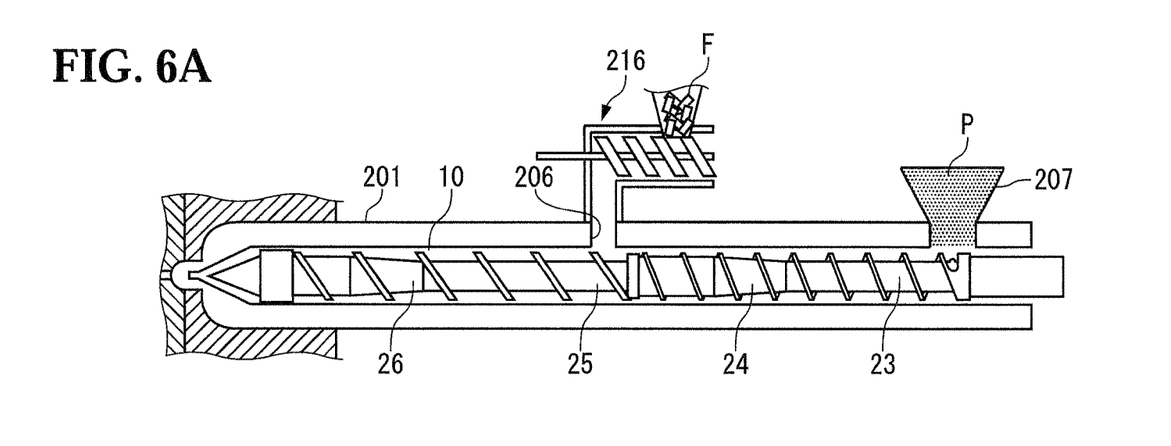
FIGS. 6A and 6B are views illustrating examples of a plasticizing unit according to the present embodiment.

Also, as shown in FIG. 6A, the reinforcing fibers F may be fed by providing a single-shaft screw feeder 216 in communication with the vent hole 206. The reinforcing fibers F are also forcibly fed into the groove of the screw 10 by the single-shaft screw feeder 216.

Also, normally, in order to strengthen adhesion between the reinforcing fibers and the resin, an additive such as maleic acid is sometimes contained in, particularly a non-polar resin such as polypropylene and polyethylene. The additive easily volatilizes when the resin raw material is melted. Therefore, it is preferable to employ a simple-type sealing structure that prevents the vent hole 206 from directly communicating with the outside, or a sealing structure capable of achieving a high level of airtightness, or to seal an inert gas such as a nitrogen gas in the vent hole 206 such that a volatile component of the additive does not leak out of the heating cylinder 201 from the vent hole 206. Sealing the inert gas in the vent hole 206 is also preferable in view of preventing peripheral air of the heating cylinder 201, which is a cause of oxidative degradation of the resin, from entering the inner portion of the heating cylinder 201.

[Method for Determining a Feed Amount of the Reinforcing Fibers During the Plasticizing Process]

Next, one example of a method for determining a feed amount of the reinforcing fibers F fed during the plasticizing process is described.

In a first step, only the resin pellet P is fed from the resin feed hopper 207 on the rear side of the heating cylinder 201 and plasticized without feeding the reinforcing fibers F from the fiber feed device 213, and a predetermined amount of resin is injected after completion of measurement.

In a second step, a weight of the injected resin is measured.

In a third step, a desired reinforcing fiber weight is calculated by adding a desired reinforcing fiber content rate to the measured weight of the resin.

In a fourth step, a feed amount of the reinforcing fibers F per unit time to be fed to the heating cylinder 201 from the twin-shaft screw feeder 214 or the single-shaft screw feeder 216 is determined from the calculated reinforcing fiber weight and a time required for plasticization.

In a fifth step, by multiplying a reference value of the feed amount or a feed speed of the reinforcing fibers F fed from the twin-shaft screw feeder 214 or the single-shaft screw feeder 216 during the plasticizing process, which is calculated in the fourth step, by a correction coefficient, an operating condition value of the feed amount of the reinforcing fibers F fed from the twin-shaft screw feeder 214 or the single-shaft screw feeder 216 during the plasticizing process is determined.

At this time, the feed amount of the reinforcing fibers F fed from the twin-shaft screw feeder 214 or the single-shaft screw feeder 216 may be controlled in synchronization with the number of revolutions or a backward movement speed of the screw 10. Also, when the number of revolutions of the screw 10 in the plasticizing process is controlled in multi-stages, the operating condition value of the feed amount of the reinforcing fibers F is determined by multiplying the number of revolutions by the correction coefficient, and the feed amount of the reinforcing fibers F from the feeder is switched every time the number of revolutions is switched.

Note that the above correction coefficient may be obtained theoretically or based on an experiment. Also, when the number of revolutions of the screw 10 in the plasticizing process is controlled in multi-stages, the correction coefficient may be set individually for each of the numbers of revolutions, or may be set to the same value.

Also, when the screw 10 is backwardly moved, a so-called effective screw length that is a distance from the raw material hopper to a distal end of the screw is shortened. Since the force for conveying the resin raw material by the rotation of the screw is thereby reduced, the backward movement speed is reduced along with a backward movement amount of the screw 10. At this time, a flow rate of the melted resin M conveyed in the screw 10 is also reduced. If the reinforcing fibers F are fed at a constant feed amount when the conveying flow rate of the melted resin M in the screw 10 is reduced, the content rate of the reinforcing fibers F contained in the melted resin M in the screw 10 may be larger than a desired value. Since the conveying flow rate of the melted resin M is substantially proportional to the backward movement speed of the screw 10, the feed amount of the reinforcing fibers F fed from the twin-shaft screw feeder 214 or the single-shaft screw feeder 216 is changed in synchronization with the backward movement speed of the screw 10, so that the desired content rate of the reinforcing fibers F can be maintained. Also, the feed amount of the reinforcing fibers F from the twin-shaft screw feeder 214 or the single-shaft screw feeder 216 may be controlled in consideration of a temporal speed difference with respect to a detection timing of the backward movement speed of the screw 10. In the screw backward movement, it is widely known that the screw backward movement speed is determined by a flow rate of the melted resin M discharged from the screw distal end that is located downstream of the fiber feed section. However, the flow rate of the melted resin M discharged from the screw distal end is a downstream flow rate as viewed from a substantially center portion of the screw 10 to which the reinforcing fibers F are fed. That is, the flow rate of the melted resin M at the screw distal end portion is a flow rate of the resin already passing through the feed section of the reinforcing fibers F in the past as viewed from the feed section. Therefore, the backward movement of the screw 10 is a result of the flow rate of the resin passing in the past. That is, when the backward movement amount of the screw 10 is large, the screw backward movement speed is reduced as described above. Thus, the flow rate of the melted resin conveyed in the screw 10 to the feed section of the reinforcing fibers F is sometimes smaller than the flow rate at the screw distal end portion. Therefore, when the feed amount of the reinforcing fibers F from the feeder is controlled on time with respect to the screw backward movement speed, the content rate of the reinforcing fibers F in the melted resin M at the feed section of the reinforcing fibers F may become larger than the desired content rate. In contrast, by controlling the feed amount of the reinforcing fibers F from the twin-shaft screw feeder 214 or the single-shaft screw feeder 216 in consideration of the temporal speed difference with respect to the detection timing of the backward movement speed of the screw 10, the desired content rate of the reinforcing fibers F can be obtained. As a method of considering the temporal speed difference, the control section 50 may previously learn a profile of the screw backward movement speed in one cycle by measurement, and, based on the profile, create a feed profile of the reinforcing fibers F from the feeder in a temporally going back form with respect to the screw backward movement speed profile, to thereby control the twin-shaft screw feeder 214 or the single-shaft screw feeder 216.

[Method for Determining a Feed Amount of the Reinforcing Fibers During the Injecting Process]

Next, in the case in which the reinforcing fibers F are forcibly fed into the groove of the screw 10 as described above, one example of a method for determining a feed amount of the reinforcing fibers F fed from the twin-shaft screw feeder 214 or the single-shaft screw feeder 216 during the injecting process is described.

In a first step, the backward movement speed of the screw 10 in the plasticizing process is calculated from position change information of the screw 10 detected by an unillustrated screw position sensor.

In a second step, a ratio of a forward movement speed of the screw in the injecting process and the backward movement speed of the screw 10 calculated in the first step is calculated. When multi-stage speed control is performed in the injecting process, a ratio of the backward movement speed of the screw 10 during the plasticizing process, which is calculated in the first step, to each speed is calculated.

In a third step, by multiplying the ratio of the backward movement speed of the screw 10 in the plasticizing process and the injecting process, which is calculated in the second step, by the feed amount or the feed speed of the reinforcing fibers F fed from the twin-shaft screw feeder 214 or the single-shaft screw feeder 216 during the plasticizing process, which has been determined and previously set in the above manner, a reference value of the feed amount or the feed speed of the reinforcing fibers F fed from the twin-shaft screw feeder 214 or the single-shaft screw feeder 216 during the injecting process is calculated.

In a fourth step, by multiplying the reference value of the feed amount or the feed speed of the reinforcing fibers F fed from the twin-shaft screw feeder 214 or the single-shaft screw feeder 216 during the injecting process, which is calculated in the third step, by a correction coefficient, an operating condition value of the feed amount of the reinforcing fibers F fed from the twin-shaft screw feeder 214 or the single-shaft screw feeder 216 during the injecting process is determined. When multi-stage speed control is performed in the injecting process, the operating condition value of the feed amount of the reinforcing fibers F is determined by multiplying each speed by the correction coefficient, and the feed amount of the reinforcing fibers F from the feeder is switched every time the injection speed is switched. Note that the above correction coefficient may be obtained theoretically or based on an experiment. Also, when multi-stage speed control is performed in the injecting process, the correction coefficient may be set individually for each speed, or may be set to the same value.

Also, the feed amount of the reinforcing fibers F fed from the twin-shaft screw feeder 214 or the single-shaft screw feeder 216 may be directly determined without using the correction coefficient. Alternatively, an irregularity in a content distribution of the reinforcing fibers in a molded article may be obtained by an experiment, and the operating condition value of the feed amount of the reinforcing fibers F fed to the screw 10 from the twin-shaft screw feeder 214 during the injecting process may be determined such that the irregularity in the content distribution of the reinforcing fibers in the molded article falls within a permissible range of the desired content rate based on an experiment result.

Note that the above method for determining the feed amount of the reinforcing fibers F fed from the twin-shaft screw feeder 214 or the single-shaft screw feeder 216 during the injecting process may be freely selected or appropriately changed into another method without departing from the scope of the present invention.

Figure 6B:
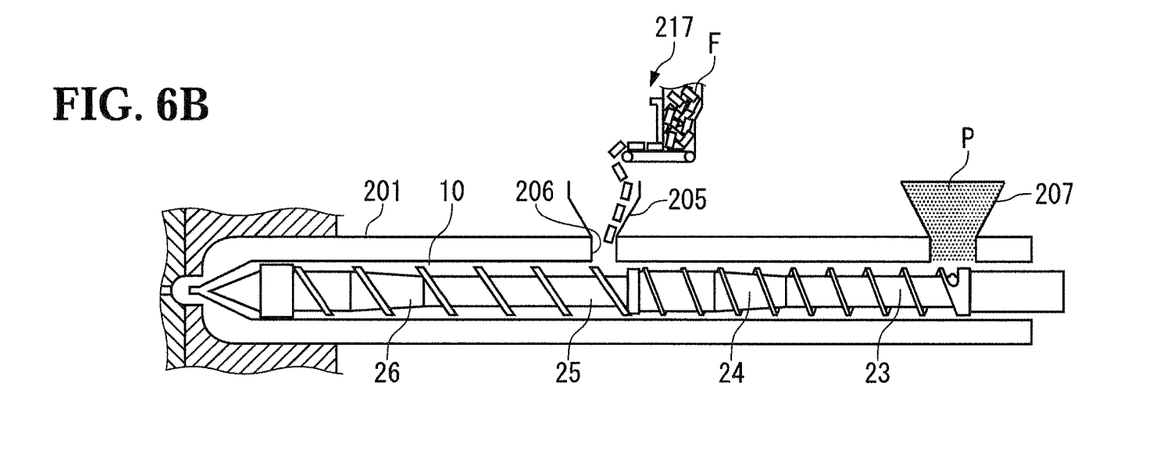

Meanwhile, when the fiber feed hopper 205 is used, a belt feeder 217 can be used as the fiber feed device 213, for example, as shown in FIG. 6B. By regulating a conveying speed of the belt feeder 217, the reinforcing fibers F can be fed to the fiber feed hopper 205 by a predetermined amount (FIG. 6B).

Here, when the reinforcing fibers F are fed to the fiber feed hopper 205 from the fiber feed device 213, the feed amount of the reinforcing fibers F is limited to a degree at which the reinforcing fibers F are not tangled in the vent hole 206, more specifically, a degree at which the vent hole 206 is not filled. The reinforcing fibers F can be thereby charged into the screw 10 without blocking the vent hole 206. Accordingly, the reinforcing fibers F can be fed into the groove of the screw 10 without stressing the reinforcing fibers F, so that fiber breakage before the reinforcing fibers F are loaded into the groove of the screw 10 can be suppressed.

Second Embodiment

In a present embodiment, the screw 10 is reversely rotated during the injecting process in order to more smoothly feed the reinforcing fibers F by using the injection molding machine 1 of the first embodiment. In the following, a point different from the first embodiment is mainly described.

Conventionally, the rotation of the screw 10 is stopped during the injecting process. In this case, however, the reinforcing fibers F may not be smoothly fed. That is, even by using the fiber feed device 213 described in the first embodiment, if a feed force of the fiber feed device 213 is small or the like, the reinforcing fibers F cannot overcome resin resistance in the groove of the screw 10, and cannot be charged into the lower side of the screw 10 during the injecting process.

Figure 4A:
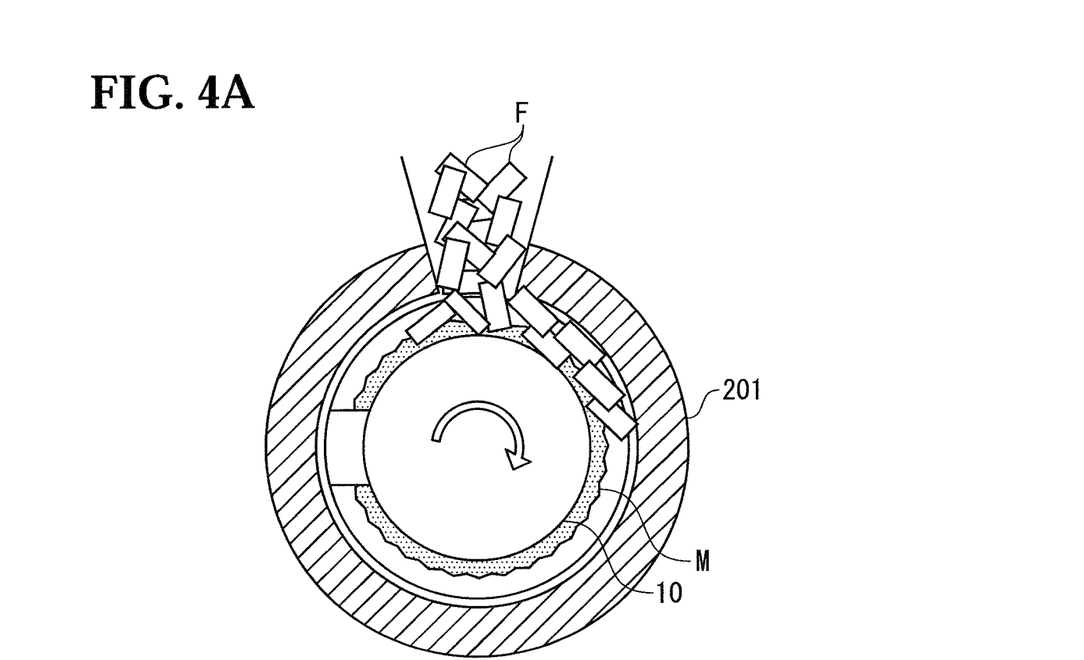
FIG. 4A corresponds to FIG. 3B.

In contrast, in accordance with the present embodiment in which the screw 10 is reversely rotated during the injecting process, the reinforcing fibers F sticking to the melted resin M are also conveyed toward the lower side of the heating cylinder 201 while being pushed into the groove of the screw 10 by reversely rotating the screw 10 as shown in FIG. 4A. Alternatively, the melted resin M accumulated on the lower side of the screw 10 is conveyed within the groove of the screw 10, and a gap that the reinforcing fibers F can enter can be generated in the groove on the lower side of the screw 10 by rotating the screw 10. Therefore, by reversely rotating the screw 10 while forwardly moving the screw 10, the reinforcing fibers F can be spread around the periphery of the screw 10. It is also possible to knead the reinforcing fibers F with the melted resin M during this time. Therefore, in accordance with the second embodiment, the reinforcing fibers F can be included thoroughly in a region ahead of the fiber feed device 213.

Although the rotation of the screw 10 during the injecting process is preferably performed throughout an entire period of the injecting process, the rotation may be stopped in a part of the period, for example, by intermittently reversely rotating the screw 10, may be alternately switched between the reverse rotation and the normal rotation, or a rotational speed may be changed continuously or in a phased manner. Also, in order to facilitate stable molding of non-defective articles, a rotation timing and speed of the reverse rotation of the screw 10 may be accurately controlled by using an unillustrated timer, or various sensors such as a screw position sensor and a rotary encoder provided in the first electric motor 209 and the second electric motor 211.

A preferable condition of reversely rotating the screw 10 is as follows. Note that the control section 50 may synchronously control the first electric motor 209 that forwardly or backwardly moves the screw 10, and the second electric motor 211 that normally or reversely rotates the screw 10 in order to achieve the preferable condition.

Figure 4B:
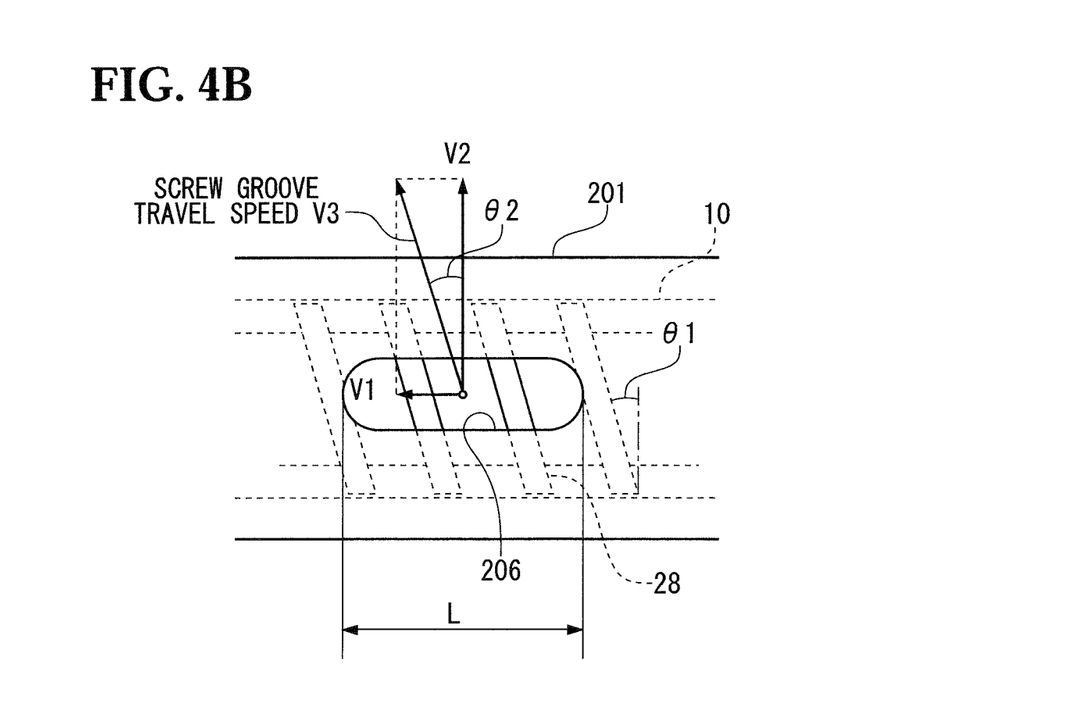
FIG. 4B is a view explaining a preferable travel speed of a screw groove in the present embodiment.

When the screw 10 is reversely rotated, a speed of forwardly moving the screw 10 (the forward movement speed) is V1, and a speed of reversely rotating the screw 10 (the rotational speed) is V2. Also, a lead angle of the second flight 28 of the screw 10 is θ1. In this case, it is preferable to match an angle θ2 formed by a travel speed V3 of the screw groove defined by the forward movement speed V1 and the rotational speed V2 with the lead angle θ1 as shown in FIG. 4B. When the condition is satisfied, a relative position of the second flight 28 with respect to the vent hole 206 to which the reinforcing fibers F are fed from the fiber feed device 213 (or a position of the second flight 28 viewed from the vent hole 206) can be made constant. Accordingly, the reinforcing fibers F can be evenly and continuously pushed into the groove of the screw 10.

While the forward movement speed V1 and the rotational speed V2 can be identified as described below, the lead angle θ1 is already known. Thus, the preferable condition can be set by adjusting the forward movement speed V1 and the rotational speed V2.

D2=Outer diameter of the second flight 28 of the screw 10 (mm)

aD2=Lead L2 of the second flight 28 of the screw 10 (mm)

nD2=Injection stroke (mm)

Injection time=t (sec)

According to the above, it is expressed as $\tan\theta_1 = aD_2/\pi D_2$ and $\tan\theta_2 = V_1/V_2$. Thus, a reverse rotational speed V20 at which θ1=θ2 is $V_{20}=\pi V_1/a$.

Note that a region of the screw 10 corresponding to a surface where the vent hole 206 is projected constitutes a fiber receiving region in the present invention.

As another preferable condition, when a travel speed of the screw groove during the plasticizing process is V4, the travel speed V3 of the screw groove has the same magnitude as that of the travel speed V4, but the travel speed V3 may have an opposite direction (reversed by) 180° from that of the travel speed V4. Accordingly, the reinforcing fibers F can be fed by an amount equal to that fed to the screw groove in the plasticizing process.

Also, in order to control the forward movement speed V1 and the rotational speed V2 of the screw 10 such that θ1=θ2 in the injecting process in which the screw 10 moves forward at high speed, a highly-precise driving control system such as driving by an electric servo motor is required. However, in an injection molding machine having no highly-precise driving control system such as hydraulic driving, the rotation of the screw 10 may be controlled at a reverse rotational speed at which the second flight 28 of the screw 10 in a region where the vent hole 206 is projected, that is, viewed from the vent hole 206, does not move more than one lead length of the second flight 28 during the injecting process.

The reverse rotational speed of the screw 10 at which the second flight 28 of the screw 10 viewed from the vent hole 206 does not move more than one lead length of the second flight 28 during the injecting process when the screw 10 is reversely rotated can be obtained as follows.

A time t0 in which the screw 10 moves forward by one lead length of the second flight 28 at the forward movement speed V1 is expressed as $t_0=aD/V_1$.

The reverse rotational speed at which a position of the second flight 28 of the screw 10 viewed from the vent hole 206 appears not to be changed during the time t0 is a speed at which the screw makes one revolution during the time t0. This is a speed at which θ1=θ2, and is V20.

When the screw 10 makes two revolutions during the time t0, the second flight 28 of the screw 10 viewed from the vent hole 206 appears to move backward by one lead length of the second flight 28 during the injecting process.

Therefore, a reverse rotational speed V21 at which the screw makes two revolutions during the time t0 is expressed as $V_{21}=2\times V_{20}$.

Also, if the screw 10 makes only a half revolution during the time t0, the second flight 28 of the screw 10 viewed from the vent hole 206 appears to move forward by one lead length of the second flight 28 during the injecting process.

Therefore, a reverse rotational speed V22 at which the screw 10 makes a half revolution during the time t0 can be expressed as $V_{22}=V_{20}/2$.

Therefore, a range of the reverse rotational speed of the screw 10 in which a movement amount of the second flight 28 of the screw 10 viewed from the vent hole 206 during the injecting process appears to be one lead length or less, is the reverse rotational speed or more at which the screw 10 makes a half revolution during the time t0, and the reverse rotational speed or less at which the screw makes two revolutions during the time t0.

Accordingly, a range of the rotational speed V2 of the screw 10 in which the movement amount of the second flight 28 of the screw 10 viewed from the vent hole 206 during the injecting process is one lead length or less is $V_{21}=V_{20}/2 \leq V_2 \leq V_{22}=2\times V_{20}$.

Therefore, by operating the screw 10 in a range of $\pi V_1/2a \leq V_2 \leq 2\pi V_1/a$, the screw groove passing through a position below the vent hole 206 can be made facing the vent hole 206 as a continuous groove. It is thus possible to prevent or suppress generation of a region not charged with the reinforcing fibers F.

When an inner portion of the vent hole 206 is caused to have a negative pressure by bringing the vent hole 206 into communication with a negative pressure generating device such as a vacuum pump, outside air entering the inner portion of the heating cylinder 201 together with the reinforcing fibers F, or a gas volatilizing from the resin and the additive to the resin can be discharged outside of the heating cylinder 201. It is thus possible to prevent molding defects such as silver streaks, voids, and black spot foreign matters due to oxidative degradation of the resin, and contamination of the mold. To discharge the outside air entering the inner portion of the heating cylinder 201 together with the reinforcing fibers F, or the gas volatilizing from the resin and the additive to the resin outside of the heating cylinder 201, a through hole from an outer peripheral surface to an inner peripheral surface of the heating cylinder 201 may be further provided ahead of the vent hole 206 for feeding the reinforcing fibers F.

Although the present invention has been described above based on the embodiments, the constitutions described in the embodiments described above may be freely selected or appropriately changed into other constitutions without departing from the scope of the present invention.

For example, regarding the screw 10, forms shown in FIGS. 5B to 5E can be employed individually or in combination by selection.

Figure 5B:
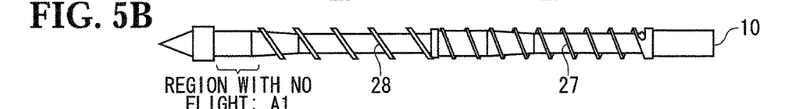

In the screw 10 shown in FIG. 5B, a region A1 with no flight is provided in the second stage 22 on the distal end side of the screw 10. In the region A1, the melted resin M containing the reinforcing fibers F in the vicinity of an inner diameter surface of the heating cylinder 201 is not scraped by the flight during the rotation of the screw and does not flow in a screw groove bottom direction along a side surface of the flight. Thus, a swirl in a groove width direction within the screw groove is not generated. Therefore, no shear force is applied to the reinforcing fibers F due to the swirling flow, and the breakage is thus suppressed. Although the region A1 shown in FIG. 5B is continuously provided on the distal end side of the screw 10, the region A1 may be intermittently provided at a plurality of positions.

Figure 5C:
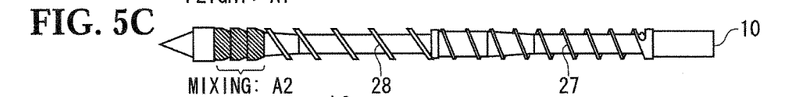

In the screw 10 shown in FIG. 5C, a region A2 provided with a mixing mechanism is provided in the second stage 22 on the distal end side of the screw 10. In a course of passing through the region A2, fibrillation and dispersion of the reinforcing fibers F contained in the melted resin M can be promoted.

Figure 5D:
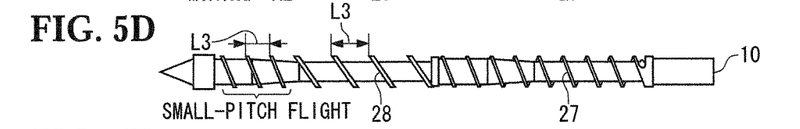

In the screw 10 shown in FIG. 5D, a region with a smaller lead L3 than the lead L2 is provided in the second stage 22 on the distal end side of the screw 10. Accordingly, a pressure-increasing capacity of the screw distal end portion as a screw-type pump is increased. It thus becomes easy to convey the melted resin M to the distal end side against the screw back pressure (the resin pressure at the distal end portion). The lead L3 is 1.2×D or less.

Figure 5E:
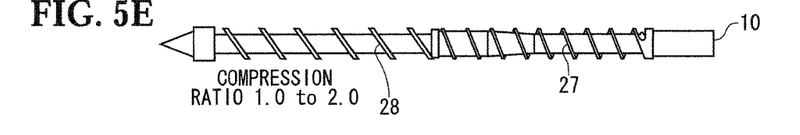

FIG. 5E shows the screw 10 in which a compression ratio of the second stage 22 is small, specifically, 1.0 to 2.0. By keeping the compression ratio of the second stage 22 small, the pressure at the screw distal end portion can be kept low. Thus, even the second flight 28 with a large lead and having a low pressure-increasing capacity easily conveys the melted resin M, and the conveying speed of the melted resin M in the screw groove can be increased. Accordingly, a time in which the reinforcing fibers F mixed into the melted resin M receive shear stress in the screw groove is shortened, and the breakage of the reinforcing fibers F can be suppressed.

Also, although omitted in the drawings, it is possible to make the outer diameter (D2) of the second flight 28 of the second stage 22 smaller than a maximum outer diameter (Dmax) of the screw 10. Accordingly, a gap is formed between an outer periphery of the second flight 28 and an inner periphery of the heating cylinder 201. The fed reinforcing fibers F can enter the gap, so that the reinforcing fibers F are more easily charged into the heating cylinder 201. It is also possible to prevent the reinforcing fibers F from being held between the flight top portion of the screw 10 and the inner diameter surface of the heating cylinder 201 to be broken. Also, the melted resin M, existing in the vicinity of a flight side surface on a pushing side that is a front side of a direction in which the screw 10 rotates, flows back to the screw groove on a rear side across the second flight 28 by the rotation of the screw 10 during the plasticizing process. Therefore, a mass of the reinforcing fibers F existing in the vicinity of a flight side surface on a pulling side that is a rear side of the rotational direction with respect to the second flight 28 is impregnated with the melted resin M at an early stage, so that the reinforcing fibers F are effectively dispersed.

Also, in the rotation of the screw 10 during the injecting process described in the second embodiment, a groove region located on the lower side of the screw 10 can be phase-shifted to a position facing the vent hole 206, not only in the reverse rotation but also in the normal rotation. Therefore, it is possible to obtain an effect of reducing the region not charged with the reinforcing fibers F similarly to the above embodiment.

Meanwhile, when the reverse rotation is performed during the injecting process, the melted resin M in the groove at the distal end portion of the screw 10 is conveyed back to a rear portion side by the reverse rotation of the screw 10, so that the pressure of the melted resin M at the distal end portion of the screw 10 is reduced. At this time, air bubbles may be generated in the melted resin M, and appear on a surface of a molded article to cause molding defects depending on a type of the resin and a condition of the reverse rotation. However, when the screw 10 is normally rotated during the injecting process, the pressure at the distal end portion of the screw 10 is not reduced, and the effect of charging the reinforcing fibers F into the groove of the screw 10 in the lower portion of the vent hole 206 can be also obtained.

When the unillustrated non-return valve provided at the distal end portion of the screw 10 is closed at a delayed timing due to an increase in the pressure of the melted resin M at the distal end portion of the screw 10 along with the normal rotation of the screw 10, it is considered as effective to delay the start of the normal rotation from the start of the forward movement of the screw 10. As delay control of the start of the normal rotation of the screw 10, methods of detecting when time is up in a timer, when a forward movement amount of the screw 10 reaches a predetermined value, and when an electric motor torque or a hydraulic force for injection reaches a predetermined value are considered.

Although the fiber feed device 213 and the resin feed hopper 207 are fixed to the heating cylinder 201 in the plasticizing unit 200 of the present invention, a movable hopper that moves in an axial direction of the screw 10 may be employed. Particularly, when the multi-shaft measuring feeder is used as the fiber feed device 213, a plurality of feeders may be connected and arranged parallel to the longitudinal direction of the screw 10, and may be used by switching the feeders that feed the reinforcing fibers F in the plasticizing process. To be more specific, the reinforcing fibers F may be fed from a feeder arranged on the distal end side of the screw 10 when the plasticizing process is started, and the feeders that feed the reinforcing fibers F may be sequentially switched to the rear side as the screw 10 moves backward in the plasticizing process such that relative positions of the screw 10 and the feeder screw from which the fibers are discharged are not changed. Accordingly, regardless of a change in relative positions of the heating cylinder 201 and the screw 10 by the backward movement of the screw 10 and the forward movement of the screw 10 at the time of injection, a feed position of the reinforcing fibers F with respect to the screw 10 can be made constant.

To be more specific, a position of the fiber-feeding feeder screw when the plasticization is completed, that is, a position of the screw groove in a rearmost portion charged with the reinforcing fibers F can be matched with a position of the fiber-feeding feeder screw when next plasticization is started, at a position of the screw moved forward by the injection. It is thus possible to continuously feed the reinforcing fibers F into the screw groove ahead of the fiber feed device 213, thereby effectively preventing or suppressing generation of a region not charged with the reinforcing fibers F within the groove of the screw 10 ahead of the fiber feed device 213.

Also, the feeder screws may be switched by simple ON/OFF control, or by changing the numbers of revolutions of adjacent screw feeders in association with each other. To be more specific, the number of revolutions of a screw feeder on the front side may be gradually decreased, and the number of revolutions of a screw feeder on the rear side may be gradually increased along with the backward movement of the screw.

Also, the feed of the reinforcing fibers F into the heating cylinder 201 may be performed not only in the injecting process and the plasticizing process, but also in a pressure keeping process and an injection waiting process (from the completion of the plasticizing process to the start of the injecting process) for example. During the pressure keeping process and the injection waiting process, the rotation and the forward movement or the reverse movement of the screw 10 are not performed. Thus, the vent hole is not intermittently blocked by the movement of the flight. The reinforcing fibers can be thereby stably fed into the groove of the screw 10, so that the resin melting region not charged with the reinforcing fibers F shown in FIG. 2B can be reduced.

Also, not only the reinforcing fibers F, but also the reinforcing fibers F in which the resin raw material in a powder or pellet form is mixed, may be fed to the fiber feed device 213. In this case, even when it is difficult for the melted resin M to intrude between fibers of the reinforcing fibers F, the mixed resin raw material is melted in the mass of the reinforcing fibers F, and enters a bundle of fibers to promote fibrillation of the fiber bundle. Also, the resin raw material in a powder or pellet form is interposed between fibers of the reinforcing fibers F or between the reinforcing fibers F and the feeder, so that a slip between fibers of the reinforcing fibers F or between the reinforcing fibers F and the feeder is suppressed. Therefore, the conveyance of the fibers by the feeder becomes stable.

Also, the resin and the reinforcing fibers applied to the present invention are not particularly limited, and widely include known materials, for example, general-purpose resins such as polypropylene and polyethylene, known resins such as engineering plastics like polyamide and polycarbonate, and known reinforcing fibers such as glass fibers, carbon fibers, bamboo fibers, and hemp fibers.

REFERENCE SIGNS LIST

1 Injection molding machine
10 Screw
21 First stage
22 Second stage
23, 25 Feed section
24, 26 Compression section
27 First flight
28 Second flight
50 Control section
100 Mold clamping unit
103 Fixed mold
109 Movable mold
111 Movable die plate
113 Hydraulic cylinder
115 Tie bar
117 Hydraulic cylinder
200 Plasticizing unit
201 Heating cylinder
205 Fiber feed hopper
206 Vent hole
207 Resin feed hopper
209 First electric motor
211 Second electric motor
213 Fiber feed device
214 Twin-shaft screw feeder
215 Pellet feed device
216 Single-shaft screw feeder
217 Belt feeder
218 Roving cutter
F Reinforcing fibers
L1, L2, L3 Lead
M Melted resin
P Resin pellet

The invention claimed is:

1. An injection molding apparatus for a fiber reinforced resin comprising:
a cylinder in which a discharge nozzle is formed on a front side;
a screw that is provided rotatably and movably in a rotation axis direction in an inner portion of the cylinder;
a resin feed section that feeds a resin raw material into the cylinder; and
a fiber feed section that is provided ahead of the resin feed section and feeds reinforcing fibers into the cylinder, wherein the screw includes
a first stage that is located on a rear side, and in which the resin raw material is melted, and
a second stage that is located on the front side and is connected to the first stage, and in which the melted resin raw material and the reinforcing fibers are mixed, and
a lead L2 of a second flight provided in the second stage is larger than a lead L1 of a first flight provided in the first stage at least in a fiber receiving region where the reinforcing fibers are fed from the fiber feed section.

2. The injection molding apparatus according to claim 1, wherein the lead L2 of the second flight in the fiber receiving region is 1.2×D to 2.0×D when an inner diameter of the cylinder is D, and
a width W2 of the second flight in the fiber receiving region is 0.01×L2 to 0.3×L2.

3. The injection molding apparatus according to claim 1, wherein the lead L1 of the first flight is 0.4×L2 to 0.8×L2.

4. The injection molding apparatus according to claim 1, wherein a predetermined amount of the reinforcing fibers is fed into the cylinder from the fiber feed section during an injecting process.

5. The injection molding apparatus according to claim 1, wherein the second stage does not include the second flight partially or entirely on a distal end side with respect to the fiber receiving region.

6. The injection molding apparatus according to claim 1, wherein the second stage includes a mixing mechanism in a predetermined region on a distal end side with respect to the fiber receiving region.

7. The injection molding apparatus according to claim 2, wherein in the second stage, a lead L3 of the second flight in a predetermined region on a distal end side with respect to the fiber receiving region is 1.2×D or less.

8. The injection molding apparatus according to claim 1, wherein a compression ratio of the second stage is 1.0 to 2.0.

9. The injection molding apparatus according to claim 1, wherein an outer diameter D2 of the second flight of the second stage is smaller than a maximum outer diameter Dmax of the screw.

10. The injection molding apparatus according to claim 1, comprising
heating means for heating the reinforcing fibers fed from the fiber feed section.

11. The injection molding apparatus according to claim 1, wherein the reinforcing fibers fed from the fiber feed section are fibers in one of a roving state and a chopped strand state, or fibers in which the both states are mixed.

12. The injection molding apparatus according to claim 1, wherein the resin raw material in a powder or pellet form is mixed and contained in the reinforcing fibers fed from the fiber feed section.

13. An injection molding method comprising:
feeding the resin raw material to the resin feed section of the injection molding apparatus according to claim 1;
feeding the reinforcing fibers in one of a roving state and a chopped strand state, or fibers in which the both states are mixed to the fiber feed section, and feeding the reinforcing fibers from the fiber feed section to the lead L2 portion of the second flight provided in the second stage having a larger flight lead than the lead L1 of the first flight provided in the first stage of the screw, to form a fiber reinforced resin.

14. The injection molding method according to claim 13, wherein the fiber reinforced resin is formed by feeding the reinforcing fibers at least in a plasticizing process and an injecting process.

15. The injection molding method according to claim 13, wherein the reinforcing fibers fed from the fiber feed section are heated.

16. The injection molding method according to claim 13, wherein the resin raw material in a powder or pellet form is mixed and contained in the reinforcing fibers fed from the fiber feed section.

17. The injection molding method according to claim 13, wherein a feed amount of the reinforcing fibers from the fiber feed section is controlled based on a change in the number of revolutions of the screw or a backward movement speed of the screw in the plasticizing process.

18. The injection molding apparatus according to claim 1, wherein the second flight is a double-line flight.

19. The injection molding apparatus according to claim 18, wherein a width W2 of the second flight is 0.01L2 to 0.15×L2.

20. An injection molding method comprising:
feeding the resin raw material to the resin feed section of the injection molding apparatus according to claim 18;
feeding the reinforcing fibers in one of a roving state and a chopped strand state, or fibers in which the both states are mixed to the fiber feed section, and feeding the reinforcing fibers from the fiber feed section to the lead L2 portion of the second flight provided in the second stage having a larger flight lead than the lead L1 of the first flight provided in the first stage of the screw, to form a fiber reinforced resin.

21. The injection molding method according to claim 20, wherein the fiber reinforced resin is formed by feeding the reinforcing fibers at least in a plasticizing process and an injecting process.

22. The injection molding method according to claim 20, wherein the reinforcing fibers fed from the fiber feed section are heated.

23. The injection molding method according to claim 20, wherein the resin raw material in a powder or pellet form is mixed and contained in the reinforcing fibers fed from the fiber feed section.

24. The injection molding method according to claim 20, wherein a feed amount of the reinforcing fibers from the fiber feed section is controlled based on a change in the number of revolutions of the screw or a backward movement speed of the screw in the plasticizing process.

* * * * *